US006471069B2

(12) United States Patent
Lin et al.

(10) Patent No.: US 6,471,069 B2
(45) Date of Patent: Oct. 29, 2002

(54) DEVICE FOR SEPARATING COMPONENTS OF A FLUID SAMPLE

(75) Inventors: Fu-Chung Lin, Wayne, NJ (US); Paul C. DiCesare, Norwalk, CT (US); Jeffrey Radziunas, Wallingford, CT (US)

(73) Assignee: Becton Dickinson and Company, Franklin Lakes, NJ (US)

( * ) Notice: Subject to any disclaimer, the term of this patent is extended or adjusted under 35 U.S.C. 154(b) by 52 days.

(21) Appl. No.: 09/727,162

(22) Filed: Nov. 30, 2000

(65) Prior Publication Data

US 2002/0064484 A1 May 30, 2002

Related U.S. Application Data

(60) Provisional application No. 60/168,819, filed on Dec. 3, 1999.

(51) Int. Cl.[7] ......................... B01D 21/26; C01N 33/49; B01L 3/14

(52) U.S. Cl. ....................... 210/359; 210/515; 210/516; 210/518; 210/360.1; 494/16; 436/177; 422/72; 422/101; 422/102

(58) Field of Search .............................. 210/359, 360.1, 210/515, 516, 518; 422/72, 101, 102; 494/16; 436/177

(56) References Cited

U.S. PATENT DOCUMENTS

| | | | |
|---|---|---|---|
| 3,849,072 | A | 11/1974 | Ayres |
| 4,083,788 | A | 4/1978 | Ferrara |
| 4,088,582 | A | 5/1978 | Murty et al. |
| 4,131,549 | A | 12/1978 | Ferrara |
| 4,154,690 | A | 5/1979 | Ballies |
| 4,257,886 | A | 3/1981 | Kessler |
| 4,364,832 | A | 12/1982 | Ballies |
| 4,417,981 | A | 11/1983 | Nugent |
| 4,443,345 | A | 4/1984 | Wells |
| 4,818,386 | A | 4/1989 | Burns |
| 4,853,137 | A | 8/1989 | Ersson |
| 4,877,520 | A | 10/1989 | Burns |
| 5,269,927 | A | 12/1993 | Feihler |
| 5,455,009 | A | 10/1995 | Vogler et al. |
| 5,575,778 | A | 11/1996 | Hardt et al. |
| 5,632,905 | A | 5/1997 | Haynes |
| 6,063,297 | A | 5/2000 | Antanavich et al. |

FOREIGN PATENT DOCUMENTS

| | | |
|---|---|---|
| EP | 0 017 127 | 3/1980 |
| EP | 0 627 261 A2 | 6/1994 |
| EP | 0 638 804 A1 | 8/1994 |
| JP | 6-222055 | 8/1994 |

*Primary Examiner*—David A. Reifsnyder
(74) *Attorney, Agent, or Firm*—Nanette S. Thomas, Esq.

(57) ABSTRACT

A device and method for separating heavier and lighter fractions of a fluid sample. The device includes a flexible collapsible inner container disposed within a substantially rigid outer container. A closure seals the open top end of the outer container. A filter assembly is sealingly mounted to the open top end of the inner container. The filter assembly includes a filter that permits lighter fractions to pass therethrough, while substantially blocking the heavier fractions. The filter assembly further includes a filter support having a slit valve registered with the filter. The slit valve opens in response to fluid pressure created by the lighter fractions for permitting the lighter fractions to flow therethrough. A fluid sample is delivered to the inner container and the device is subjected to centrifugation whereby the centrifugal load causes the filter assembly to move toward the bottom end of the outer container and thereby enable the lighter fraction of the fluid sample to flow through the slit valve and into the space between the inner and outer containers. The slit valve closes upon termination of the centrifugal load such that separation between the heavier and lighter fractions of the fluid sample are maintained.

15 Claims, 4 Drawing Sheets

DEVICE FOR SEPARATING COMPONENTS OF A FLUID SAMPLE

This application claims the benefit of U.S. provisional application Ser. No. 60/168,819 filed Dec. 3, 1999, the disclosure of which is hereby incorporated by reference.

BACKGROUND OF THE INVENTION

1. Field of the Invention

This invention relates to a device and method for separating heavier and lighter fractions of a fluid sample. More particularly, this invention relates to a device and method for collecting and transporting fluid samples whereby the device and fluid sample are subjected to centrifugation in order to cause separation of the heavier fraction from the lighter fraction of the fluid sample.

2. Description of Related Art

Diagnostic tests may require separation of a patient's whole blood sample into components, such as serum or plasma, the lighter phase component, and red blood cells, the heavier phase component. Samples of whole blood are typically collected by venipuncture through a cannula or needle attached to a syringe or an evacuated collection tube. Separation of the blood into serum or plasma and red blood cells is then accomplished by rotation of the syringe or tube in a centrifuge. Such arrangements use a barrier for moving into an area adjacent the two phases of the sample being separated to maintain the components separated for subsequent examination of the individual components.

A variety of devices have been used in collection devices to divide the area between the heavier and lighter phases of a fluid sample.

The most widely used device includes thixotropic gel materials such as polyester gels in a tube. The present polyester gel serum separation tubes require special manufacturing equipment to prepare the gel and to fill the tubes. Moreover, the shelf-life of the product is limited in that overtime globules may be released from the gel mass. These globules have a specific gravity that is less than the separated serum and may float in the serum and may clog the measuring instruments, such as the instrument probes used during the clinical examination of the sample collected in the tube. Such clogging can lead to considerable downtime for the instrument to remove the clog.

No commercially available gel is completely chemically inert to all analytes. If certain drugs are present in the blood sample when it is taken, there can be an adverse chemical reaction with the gel interface.

Therefore, a need exists for a separator device that (I) is easily used to separate a blood sample; (ii) is independent of temperature during storage and shipping; (iii) is stable to radiation sterilization; (iv) employs the benefits of a thixotropic gel barrier yet avoids the many disadvantages of placing a gel in contact with the separated blood components; (v) minimizes cross contamination of the heavier and lighter phases of the sample during centrifugation; (vi) minimizes adhesion of the lower and higher density materials against the separator device; (vii) is able to move into position to form a barrier in less time than conventional methods and devices; (viii) is able to provide a clearer specimen with less cell contamination methods and devices; and (ix) can be used with standard sampling equipment.

SUMMARY OF THE INVENTION

The present invention is a method and assembly for separating a fluid sample into a higher specific gravity phase and a lower specific gravity phase. Desirably, the assembly of the present invention includes a rigid outer container, a flexible inner container and a filter assembly for providing communication between the inner and outer containers.

The outer container may be a tube having opposed longitudinal ends and a substantially cylindrical sidewall extending therebetween. Both ends of the tube are substantially closed or closeable. For example, one end of the tube may have a permanent closure extending unitarily from the cylindrical sidewall of the tube. The opposed end of the tube may be substantially open, but may receive a needle pierceable resealable closure. Alternatively, both ends of the tube may be open, and both open ends of the tube may be sealed by elastomeric closures. At least one of the closures of the tube may include a needle pierceable resealable septum.

The inner container may be a flexible collapsible tubular bag formed from a transparent plastic material. The inner container is disposed within the outer container, and in a non-collapsed state may extend substantially between the opposed ends of the outer container. However, the inner container, such as the tubular plastic bag, is selectively collapsible toward one end of the outer container.

The filter assembly comprises a filter that is operative to permit blood serum to pass therethrough. However, the filter will substantially prevent the more dense red blood cells from passing therethrough. The filter assembly further includes a filter support in which the filter is securely retained. The filter support may comprise a cylindrical sidewall having opposed longitudinal ends. An end wall may extend across one longitudinal end of the cylindrical sidewall of the filter support. The end wall includes at least one slit valve formed therein. The slit valve is disposed at a location on the end wall that will substantially register with the filter. For example, the filter may define a substantially thick-walled tube retained by the support of the filter assembly. In this embodiment, the slit valve may define arc sections disposed on portions of the end wall that will register with one end of the tubular filter. In other embodiments, the filter may effectively define a continuous cylindrical plug that is securely engaged within the filter support. In this embodiment, the slit valve can take other configurations, such as a short diametrically aligned slit in the circular end wall.

In all embodiments, the filter assembly is dimensioned to be slidably moveable within the outer container. Additionally, the filter assembly and the flexible inner container define a secure fluid tight connection therebetween. For example, a tubular plastic bag defining the flexible inner container may have portions adjacent the open end disposed between the filter and inner surface areas of the filter support.

In use, a fluid sample enters the assembly by needle. The needle penetrates through the resealable closure and is urged into communication with the interior of the flexible inner container. The sample is then directed into the flexible inner container. The assembly is then placed in a centrifuge such that the filter assembly is at a radially inner position relative to the fluid sample within the flexible inner container. The centrifuge then is operated to place a centrifugal load on the assembly. The centrifugal load causes the more dense phase liquid to move outwardly relative to the axis of rotation of the centrifuge, and simultaneously causes the less dense phase liquid to move into locations closer to the axis of rotation of the centrifuge. The centrifugal load also causes the filter assembly to move away from the axis of rotation of the centrifuge. As a result, the less dense phase liquid is urged into the filter. The centrifugal load also causes the less dense phase liquid to open the slit valve sufficiently for the serum to flow out of the flexible inner container and into the space between the inner and outer containers. The outflow of the less dense phase liquid from the inner container causes the walls of the flexible inner container to collapse gradually, thereby decreasing the volume of the inner container. Simultaneously, there is a corresponding increase in the volume between the inner and outer containers as the less dense phase liquid flows through the filter assembly. After sufficient centrifugation, substantially all of the less dense phase liquid will have passed through the filter assembly. However, the filter prevents a flow of the more dense phase liquid therethrough. As a result, the more dense phase liquid is retained within the inner container, while the less dense phase liquid is retained in the space between the inner and outer containers. Additionally, upon termination of the centrifugal load, the less dense phase liquid disposed in the space between the inner and outer containers will not be subjected to any forces that would cause the less dense phase liquid to migrate back across the filter assembly and into the inner container. As a result, the two phases of the fluid sample may be removed separately from their respective containers and analyzed in a laboratory.

The assembly of the present invention is advantageous over existing separation products that use gel. In particular the assembly of the present invention will not interfere with analytes as compared to gels that may interfere with analytes. Another attribute of the present invention is that the assembly of the present invention will not interfere with therapeutic drug monitoring analytes.

Another notable advantage of the present invention is that fluid specimens are not subjected to low density gel residuals that are at times available in products that use gel.

A further attribute of the present invention is that there is no interference with instrument probes.

Another attribute of the present invention is that samples for blood banking tests are more acceptable than when a gel separator is used.

Additionally, the assembly of the present invention does not require any additional steps or treatment by a medical practitioner, whereby a blood or fluid sample is drawn in the standard fashion, using standard sampling equipment.

DETAILED DESCRIPTION

Figure 1:
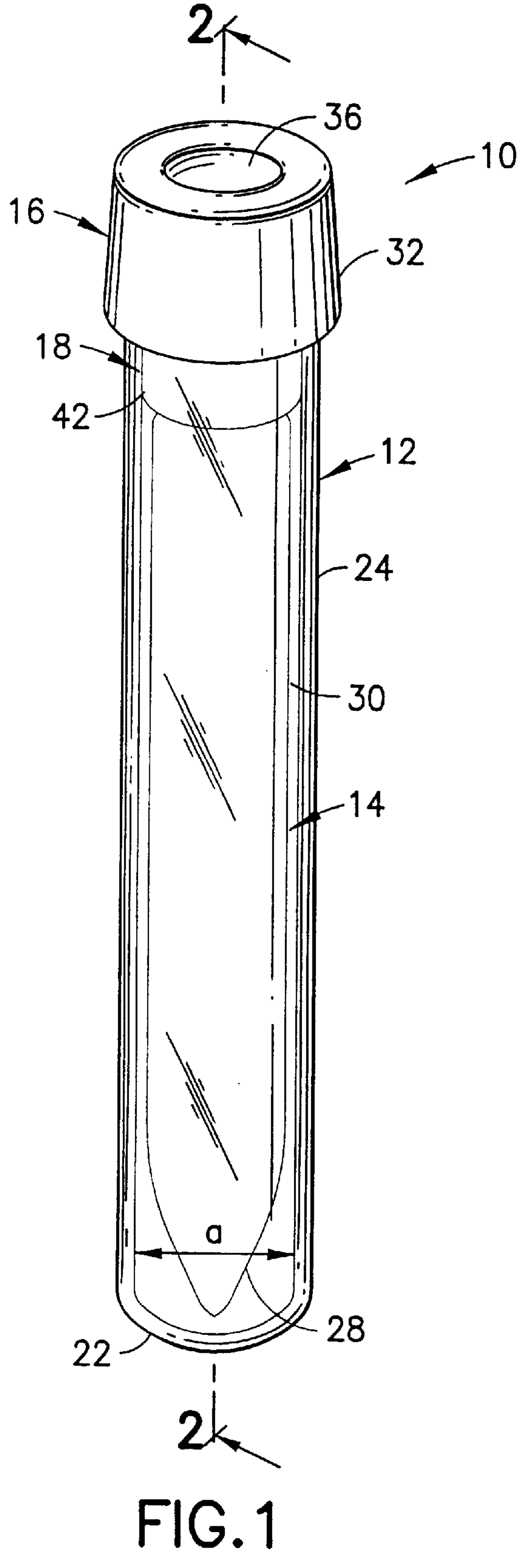
FIG. 1 is perspective view of the assembly of the present invention.

The present invention is illustrated in FIGS. 1–4 wherein assembly 10 includes an outer container 12, an inner container 14, a closure 16 and a filter assembly 18.

Outer container 12 is a rigid clear plastic or glass tube having an open top 20, a closed bottom 22 and a cylindrical sidewall 24 extending between top 20 and bottom 22. Cylindrical sidewall 24 defines an inside diameter "a" as shown in FIG. 1.

Inner container 14 is formed from a flexible and collapsible clear plastic material that is substantially impervious to fluid. Inner container 14 has an open top end 26, a closed bottom end 28 and a flexible collapsible sidewall 30 extending therebetween.

Closure 16 is formed from an elastomeric material and includes an outer skirt 32 dimensioned for sealed telescoped engagement over portions of cylindrical sidewall 24 of outer container 12 adjacent open top 20 thereof. Additionally, closure 16 includes a plug portion 34 dimensioned for sealed engagement within open top 20 of outer container 12. The center region 36 of closure 16 is recessed and defines a resealable septum through which a needle cannula 38 can be inserted. Upon removal of needle cannula 38, septum portion 36 will reseal itself.

Filter assembly 18 includes a filter 40 and a filter support 42. Filter 40 is formed from a material that will permit the less dense phase liquid to pass therethrough, while substantially preventing the more dense phase from passing therethrough. Filters with these performance specifications are commercially available and are marketed, for example, by Becton Dickinson as an Auto ISO-filter.

Figure 6:
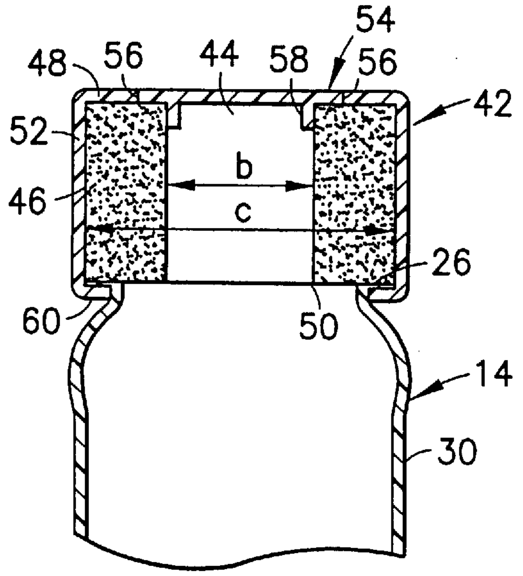
FIG. 6 is a cross-sectional view of the container and filter assembly of FIG. 5 taken along line 6—6 thereof.

As shown in FIG. 6, filter 40 is a substantially thick-walled tubular shape and includes an inner circumferential surface 44 defining an inside diameter b and an outer circumferential surface 46 defining an outside diameter c. Filter 40 further includes a top end 48 and an opposed bottom end 50.

Filter support 42 is unitarily molded from a thermoplastic material and includes an outer cylindrical sidewall 52 having an inside diameter which is substantially equal to outside diameter c defined by outer circumferential surface 46 of filter 40. Additionally, outer cylindrical sidewall 52 defines an outside diameter which is slightly less than inside diameter "a" defined by cylindrical sidewall 24 of outer container 12. Relative dimensions of the outer cylindrical sidewall 52 of filter support 42 and cylindrical sidewall 24 of outer container 12 enable filter assembly 18 to move slidably within outer container 12.

Filter support 42 further includes a generally circular top wall 54 extending substantially continuously across an end of cylindrical sidewall 52 of filter support 42. Top wall 54 is characterized by a pair of slit valves 56 extending arcuately at a location on top wall 54 that registers with top end 48 of filter 40. Slit valves 56 remain substantially closed in an unbiased condition of top wall 54. However, in response to fluid forces exerted on top wall 54, the thermoplastic material of top wall 54 adjacent slit valves 56 will deform sufficiently to permit fluid flow therethrough. Top wall 54 is further characterized by a short inner cylindrical wall 58 extending downwardly therefrom and concentrically within outer cylindrical wall 52. Inner cylindrical wall 58 defines an outside diameter approximately equal to inside diameter b of inner circumferential surface 44 of filter 40. With this construction, filter 40 is effectively trapped between outer cylindrical wall 52 and inner cylindrical wall 58.

Filter support 42 further includes an annular bottom lip 60 extending inwardly from the end of outer cylindrical wall 52 opposite circular top wall 54. Lip 60 functions to retain filter 40 between lip 60 and top wall 54. Lip 60 may initially define a cylindrical extension of outer circumferential wall 52, and subsequently may be formed inwardly as explained herein.

Filter assembly 18 is assembled by slidably inserting tubular filter 40 into the end of filter support 42 opposite top wall 54. Portions of inner container 14 adjacent open top end 26 are positioned adjacent portions of bottom end 50 of filter 40 adjacent outer circumferential surface 46 of filter 40. The end of outer cylindrical wall 52 of filter support 42 opposite top wall 54 thereof then is deformed inwardly to define lip 60. As a result, filter 40 is securely retained in filter support 42 and inner container 14 is securely engaged with filter assembly 18.

Assembly proceeds by sliding inner container 14 and filter assembly 18 into open top 20 of outer container 12. Container assembly 10 then is enclosed by sealingly mounting closure 16 onto open top 20 of outer container 12.

Figure 2:
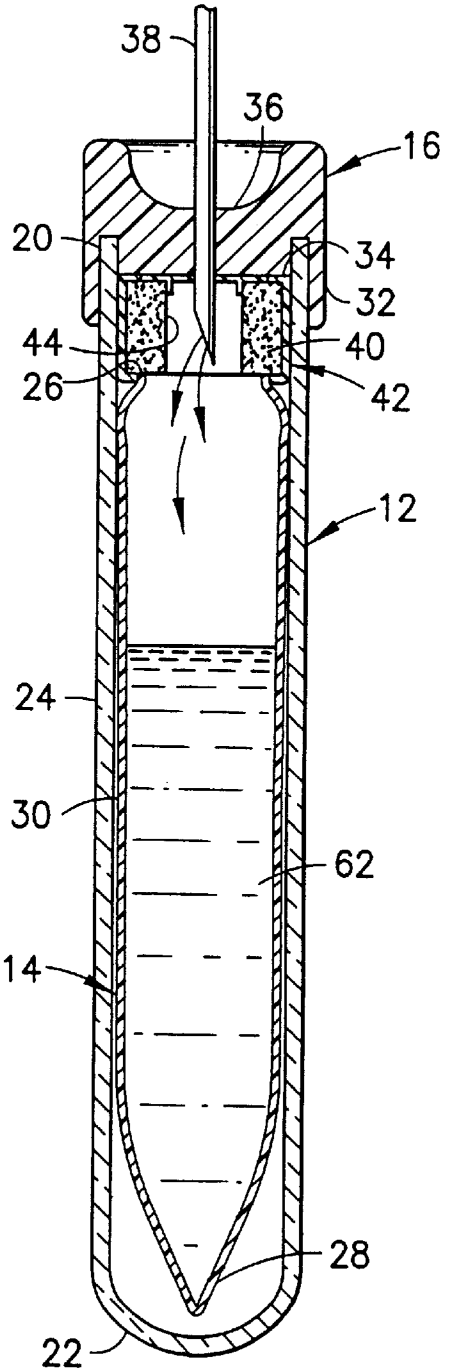
FIG. 2 is a cross-sectional view of the assembly of FIG. 1 taken along line 2—2 thereof and showing a needle depositing a sample of fluid into the assembly.

As shown in FIG. 2, a liquid sample is delivered into inner container 14 by needle 38 that penetrates through resealable septum portion 36 of stopper 16 and through portions of top wall 54 of filter support 42. For purposes of illustration only, the liquid sample is blood. The sample of blood then is deposited into the inner container 14, as shown in FIG. 2, and is isolated from the space between inner container 14 and outer container 12. Upon removal of needle 38, septum portion 36 of closure 16 reseals itself.

Figure 3:
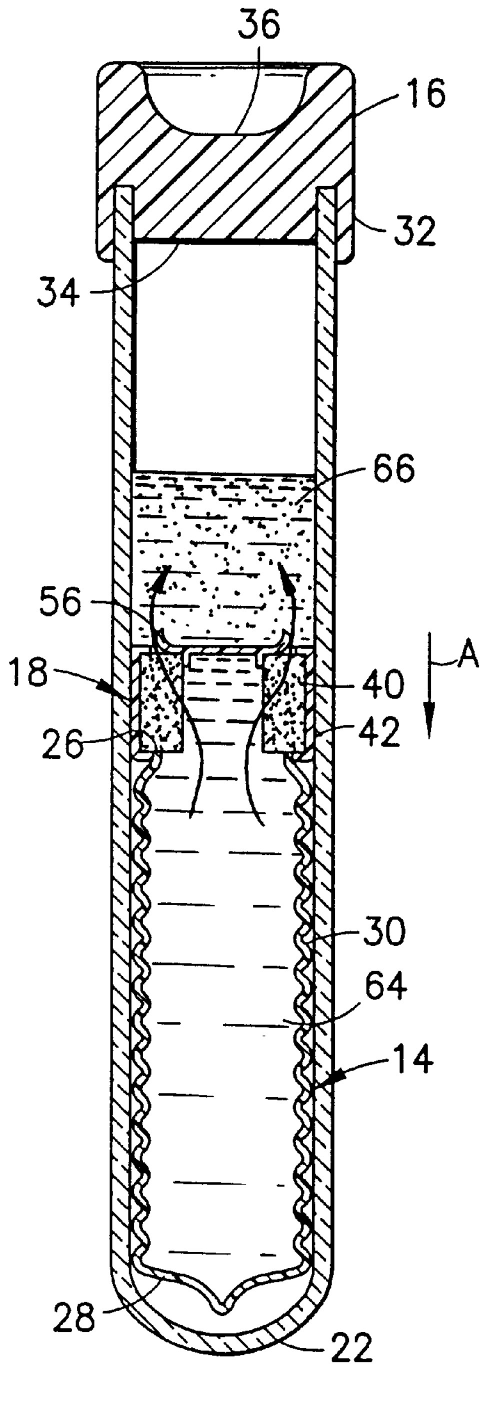
FIG. 3 is a cross-sectional view of the assembly of FIG. 1 taken along line 2—2 thereof, showing the assembly at an intermediate stage of a centrifugation process.
Figure 4:
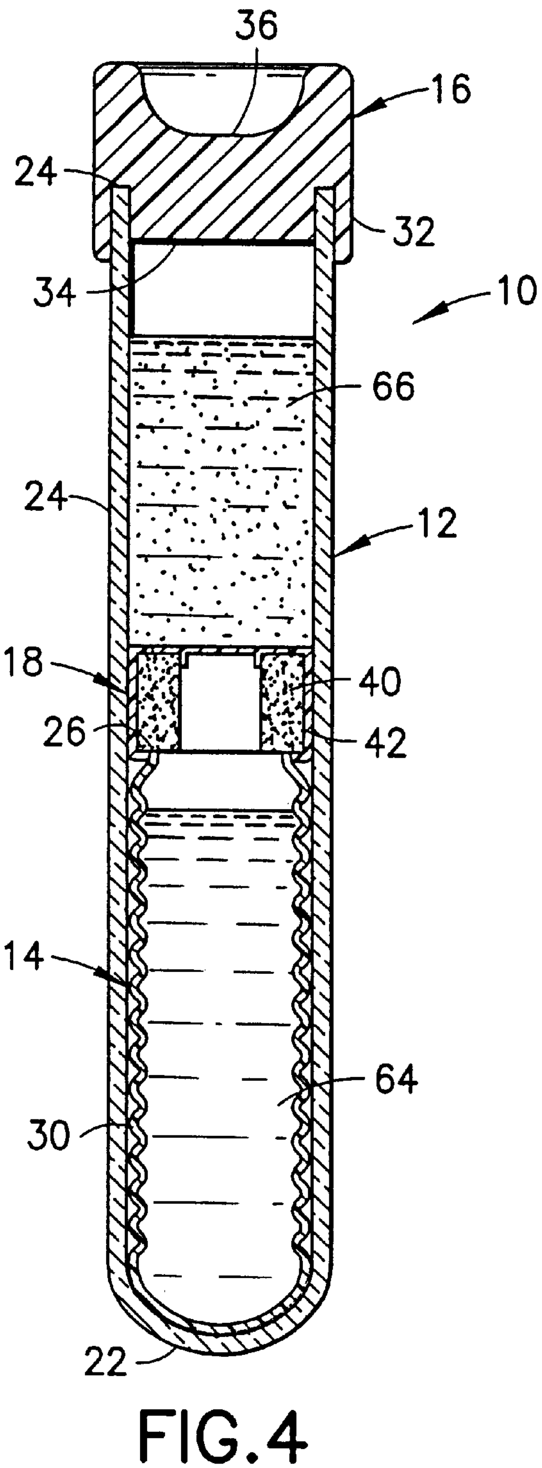
FIG. 4 is a cross-sectional view of the assembly of FIG. 1 taken along line 2—2 thereof, showing the assembly after completion of centrifugation.
Figure 5:
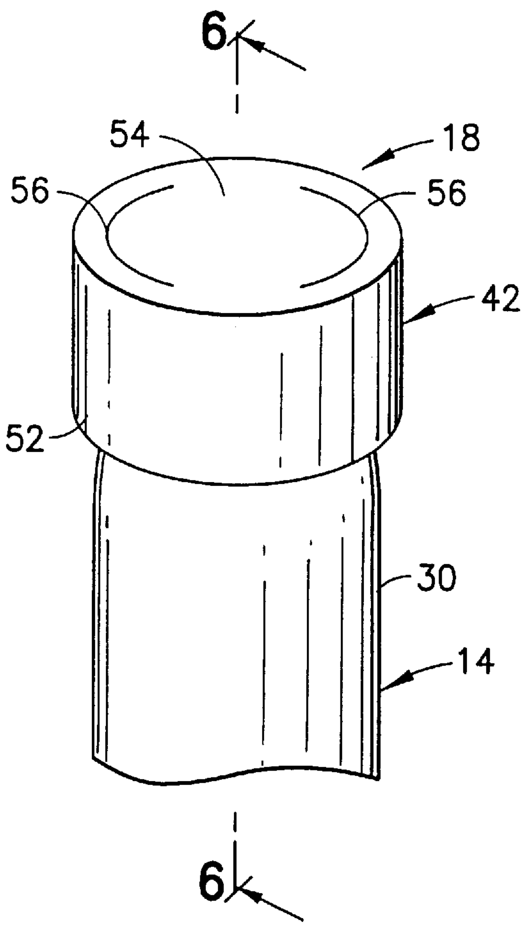
FIG. 5 is a perspective view of the flexible inner container and the filter assembly of the assembly.

Assembly 10 next is placed in a centrifuge such that top end 20 of outer container 12 is closer than the bottom end 22 to the axis of rotation of the centrifuge. The centrifuge than is operated to create centrifugal loading on blood sample 62. As shown in FIG. 3, the centrifugal loading urges the filter assembly in the direction indicated by arrow "A" toward bottom end 22 of outer container 12 and simultaneously generates a separation of the respective phases of the blood sample 62 in accordance with their densities. More specifically, red blood cells of blood sample 62 move away from the rotational axis of the centrifuge and toward closed bottom end 28 of inner container 14. Simultaneously less dense serum moves toward the rotational axis of the centrifuge and away from closed bottom end 28 of inner container 14. The centrifugal loading that causes this separation of the red blood cells 64 and serum 66 and that causes the movement of filter assembly 18 within outer container 12 urges serum 66 through filter 40 also creates biasing forces on portions of top wall 54 in proximity to slit valves 56. This loading deflects top wall 54 at slit valves 56 into an open condition that permits the flow of serum through slit valves 56 and into the space between inner and outer containers 14 and 12 respectively. After sufficient centrifugation, only red blood cells 64 will remain within inner container, and substantially all of serum 66 that had been in the initial blood sample will lie between inner and outer containers 14 and 12 respectively as shown in FIG. 4. The centrifuge then is stopped, and top wall 54 resilient returns to an unbiased condition in which slit valves 56 close. Closure 16 then can be separated from open top 20 of outer container 12 to enable serum 66 to be separated and to subsequently enable access to red blood cells of the blood sample that are isolated within inner container 14.

Figure 7:
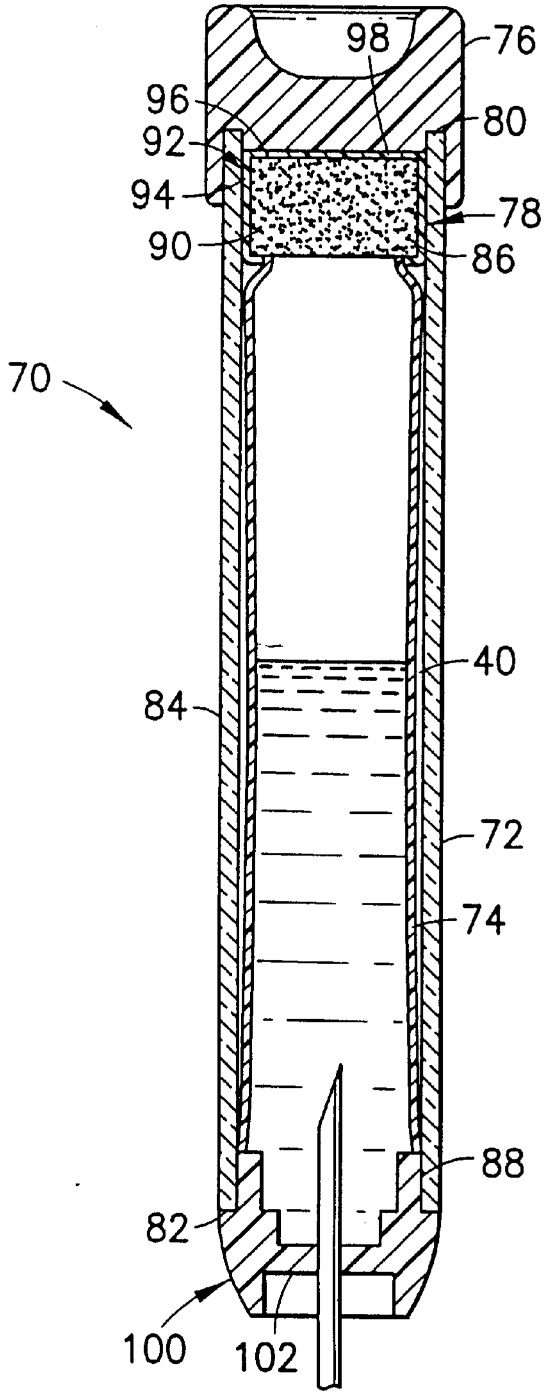
FIG. 7 is a cross-sectional view of the container and filter assembly of FIG. 5 taken along 6—6 thereof, but showing an alternate container assembly.
Figure 8:
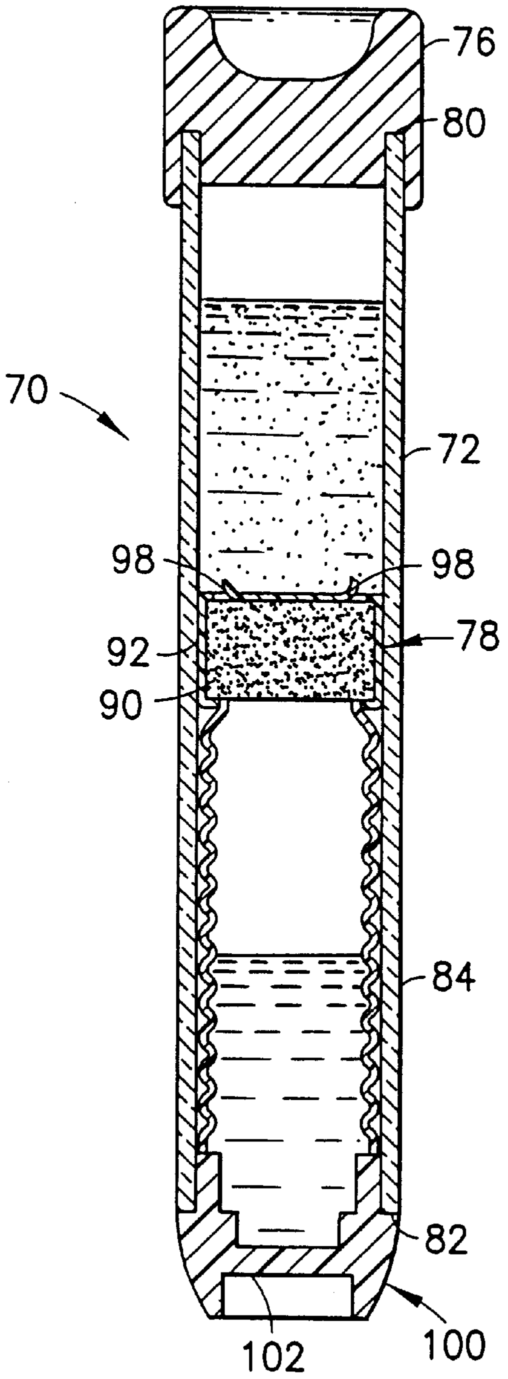
FIG. 8 is a cross-sectional view of the container and filter assembly of FIG. 5 taken along 6—6 thereof, but showing an alternate container assembly.

An alternate assembly 70 in accordance with the present invention is shown in FIGS. 7 and 8. Assembly 70 includes a substantially rigid clear plastic or glass outer container 72, a flexible collapsible inner container 74, a closure 76 and a filter assembly 78.

Outer container 72 concludes an open top end 80, an open bottom end 82 and a rigid cylindrical sidewall 84 extending therebetween. Sidewall 84 may define an inside diameter substantially the same as the inside diameter of the sidewall 24 of the first embodiment.

Inner container 74 includes an open top end 86, an open bottom end 88 and a flexible sidewall extending therebetween.

Closure 76 is substantially identical to closure 16 described and illustrated above. Additionally, filter assembly 78 is structurally and functionally very similar to filter assembly 18 described and illustrated above. More particularly, filter assembly 78 includes a filter 90 and a filter support 92. Filter 90 is a substantially solid cylindrical plug, as compared to the tubular filter of the previous embodiment. Filter support 92 includes a cylindrical outer sidewall 94 that surrounds filter 90 and a circular top wall 96 that extends across the continuous circular top end of filter 90. Top wall 96 does not include a downwardly depending short cylindrical inner wall comparable to the cylindrical inner wall of the first embodiment. Thus, the circular top end of filter 90 can abut circular top wall 96 of filter support 92. Top wall 96 includes at least one slit valve 98 that is comparable to the slit valves 56 described and illustrated with respect to the first embodiment. However, in view of the continuous solid cylindrical configuration of filter 90, slit valves 98 may be disposed at any convenient locations on top wall 96 of filter support 92. Open top end 86 of inner container 74 is securely engaged with filter 90 and filter support 92 substantially as described above.

Assembly 70 further includes a bottom closure 100 that is securely engaged within the open bottom end 82 of outer container 72 and the open bottom end 82 of the inner container 74. More particularly, bottom closure 100 is dimensioned to sealingly hold inner and outer container 74 and 72 respectively with one another at their open bottom ends. Bottom closure 100 includes a resealable septum 102 which is structurally and functionally similar to the resealable septum 36 of the top closure 16 described and illustrated above.

Assembly 70 is used by initially depositing a sample of blood into inner container 72 by passing a needle cannula 38 through septum 102 of bottom closure 100 and placing the blood sample in inner container 74. The assembly then is centrifuged substantially as described above. The centrifugation will cause filter assembly 78 to slidably move within outer container 72 and away from top closure 76. Simultaneously, the centrifugation will cause red blood cells of the collected blood sample to move toward bottom closure 100, while serum will be urged toward top closure 76. These centrifugal loads will cause serum to pass through filter 90 and the fluid pressure of the serum will open slit valves 98 such that the serum of the blood sample will move into the space between inner and outer containers 74 and 72 respectively. After the respective phases of the blood sample have been completely separated, the centrifuge is stopped. The removal of the centrifugal load causes slit valves 98 to close, thereby maintaining separation between the serum and the red blood cells. Top closure 76 then is removed to access and remove the serum. The red blood cells within the inner container then may be accessed for subsequent analysis.

What is claimed is:

1. An assembly comprising:

an outer container having a bottom end, an open top end and a substantially rigid sidewall enclosure extending therebetween;

an inner container disposed within said outer container, said inner container having a bottom end in proximity to said bottom end of said outer container, an open top end and a flexible collapsible sidewall enclosure extending therebetween;

a closure sealingly engaged with said open top end of said outer container for defining a sealed space between said inner and outer containers; and a filter assembly movably disposed within said outer container and sealingly engaged with said open top of said inner container, said filter assembly comprising a filter that permits less dense phase of a liquid sample to flow therethrough and prevents more dense phase of the liquid sample from flowing therethrough.

2. The assembly of claim 1, wherein the filter assembly further includes a filter support surrounding portions of said filter externally of said inner container, said filter support including at least one valve that is openable in response to fluid pressure thereon for permitting a flow of said less dense phase liquid through said filter assembly and into a space between said inner and outer containers.

3. The assembly of claim 2, wherein the valve is a slit valve.

4. The assembly of claim 3, wherein said filter is substantially tubular and has an inner circumferential surface, an outer circumferential surface, a bottom end and a top end, said bottom end of said filter and said inner circumferential surface thereof being in communication with interior portions of said inner container, said filter support including a cylindrical outer wall surrounding and engaging said outer circumferential surface of said filter, said filter support further having a top wall extending across one end of said cylindrical outer wall of said filter support, said at least one slit valve being substantially registered with said top end of said filter.

5. The assembly of claim 4, wherein said at least one slit valve comprises a plurality of arcuate slit valves.

6. The assembly of claim 4, wherein said filter support further comprises an inner cylindrical wall depending from said top wall of said filter support and engaging a portion of said inner circumferential surface of said filter.

7. The assembly of claim 4, wherein portions of said inner container adjacent said open top thereof are sealingly engaged between said filter and said filter support.

8. The assembly of claim 7, wherein said filter support further comprises an annular bottom wall extending inwardly from portions of said cylindrical outer wall of said filter support remote from said top wall, said bottom wall of said filter support engaging a portion of said bottom end of said filter for retaining said filter in said filter support.

9. The assembly of claim 8, wherein portions of said inner container adjacent said open top thereof are sealingly engaged between said bottom end of said filter and said bottom wall of said filter support.

10. The assembly of claim 4, wherein said outer container is unitarily formed and has a closed bottom, and wherein said inner container is unitarily formed and has a closed bottom.

11. The assembly of claim 4, wherein said closure and said top wall of said filter support each include a central portion that is pierceable by a needle for depositing a sample of blood in said inner container, said closure being formed from a resealable elastomeric material.

12. The assembly of claim 3, wherein said filter comprises substantially circular top and bottom ends and a cylindrical outer surface extending therebetween, said filter being substantially continuous between said top and bottom ends and inwardly of said outer circumferential surface, and wherein said filter support comprises a cylindrical outer wall surrounding and engaging said outer cylindrical surface of said filter and a circular top wall substantially abutting said circular top surface of said filter, said at least one slit valve being formed in said top wall of said filter support.

13. The assembly of claim 12, wherein said filter support further comprises an annular bottom wall extending inwardly from portions of said cylindrical outer wall of said filter support remote from said top wall, said bottom wall of said filter support engaging portions of said bottom surface of said filter adjacent said outer cylindrical surface thereof.

14. The assembly of claim 12, wherein portions of said inner container adjacent said open top thereof are sealingly engaged between said filter support and said filter.

15. The assembly of claim 12, wherein said inner and outer containers each have open bottom ends, a needle pierceable closure being sealingly engaged with portions of said inner and outer containers adjacent said open bottom ends thereof, said bottom closure including a resealable septum for permitting passage of a needle cannula therethrough for depositing a sample of blood within said inner container.

* * * * *